(12) United States Patent  
Walker

(10) Patent No.: US 6,665,729 B2  
(45) Date of Patent: *Dec. 16, 2003

(54) DATA TRANSMISSION UTILIZING PRE-EMPTIVE ACKNOWLEDGEMENTS WITH TRANSACTION-ORIENTED PROTOCOLS

(75) Inventor: Ted W. Walker, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/927,459

(22) Filed: Aug. 13, 2001

(65) Prior Publication Data

US 2002/0095511 A1 Jul. 18, 2002

Related U.S. Application Data

(63) Continuation of application No. 09/222,714, filed on Dec. 29, 1998, now Pat. No. 6,321,269.

(51) Int. Cl.[7] .............................................. G06F 13/00
(52) U.S. Cl. .................................................... 709/237
(58) Field of Search ............................... 709/200, 217, 709/218, 219, 227, 230, 231, 232, 237, 167, 749

(56) References Cited

U.S. PATENT DOCUMENTS 4,862,461 A * 8/1989 Blaner ......................... 714/749
5,900,020 A * 5/1999 Safranek et al. ............ 711/167

OTHER PUBLICATIONS

Comer, Douglas E. and Stevens, David L., "Internetworking with TCP/IP", vol. 111, Client–Server Programming and Applications, Department of Computer Sciences, Purdue Univ., West Lafayette, IN 47907, Prentice Hall, Inc., Englewood Cliffs, NJ pp. 49–55 1993.*

* cited by examiner

Primary Examiner—Robert B. Harrell
(74) Attorney, Agent, or Firm—Burns, Doane, Swecker & Mathis, L.L.P.

(57) ABSTRACT

A modified stream-based protocol implementation is employed within a network environment to compensate for inefficiencies associated with conventional stream based protocols, such as TCP. Characteristics of a transaction-based protocol are advantageously utilized in client/server data transactions to reduce the number of acknowledgment signals sent upon receipt of data, as well as eliminate delays associated with the buffering of data at the server. These results are accomplished without requiring changes to servers using standard stream-based protocols.

14 Claims, 5 Drawing Sheets

DATA TRANSMISSION UTILIZING PRE-EMPTIVE ACKNOWLEDGEMENTS WITH TRANSACTION-ORIENTED PROTOCOLS

This application is a continuation of application Ser. No. 09/222,714, filed on Dec. 29, 1998, now U.S. Pat. No. 6,321,269.

BACKGROUND OF THE INVENTION

1. Field of the Invention

The present invention is directed to computer network communications, and more particularly to a stream-based protocol that can be efficiently interfaced with a transaction-based protocol.

2. Description of the Related Art

With the advent of computers in the workplace, local area networks (LANs) have grown increasingly valuable for businesses as their dependency upon fast and efficient dissemination of information grows. One commonly employed type of network generally comprises at least one server and a plurality of clients (e.g., workstations).

An exemplary conventional client/server network 100 is illustrated in FIG. 1. A first server 110a is connected to a plurality of client workstations 120. The architecture for connecting the clients and servers can be Ethernet or token ring, for example. The server 110a is able to control access to a resource (e.g., a hard disk or printer) and serves as a host to the client workstations 120. Each client workstation 120 makes requests to the server 110a for access to files, programs or peripheral devices that are controlled by the server. A client/server network, such as the network illustrated in FIG. 1, can also be connected to another client/server network having a server 110b. The various networks transfer information to one another through devices such as bridges and gateways.

A network uses protocols to quickly and efficiently transmit data from one location to another. A protocol is a set of predefined rules that govern how two or more connected processors communicate and interact to exchange data. Protocols are distinguished by several different properties such as the "layer" at which the protocol operates, and the network architecture for which the protocol is designed. Additionally, protocols can be synchronous or asynchronous, connection-oriented or connectionless, character- or bit-oriented and stream-based or transaction-based.

When implementing a protocol within a network, the choice of whether the system operates with a stream-based protocol or a transaction-based protocol determines how data will be transmitted from one location to another within the network. An example of a stream-based protocol is the transmission control protocol (TCP) which has no restrictions on the amount of data sent from one location to another within a network. Standard TCP implementations attempt to optimize the bulk transfer of large amounts of data over a network. This is achieved by buffering data being sent into large data groups each having a size equal to the maximum amount of data that can be transmitted as a unit, which is known as a Maximum Transmission Unit (MTU). This technique reduces the number of packets needed to send data to a destination processor.

An example of a transaction-based protocol is the Apple-Talk File Protocol (AFP), which moves data from one location to another based upon discrete requests and discrete responses. In response to each discrete request, the server normally sends a packet with a specific amount of data. As a result, many more discrete packets of data can be required to send a message than when a stream-based protocol is used to send data.

While it is evident from the above description that transaction-based and stream-based protocols are fundamentally different, attempts have been made to use both protocols in conjunction with one another, where the transaction-based protocol is layered on top of the stream based protocol. In this case a data transmission is subject to both protocols. When using a transaction-based protocol in conjunction with a standard stream-based protocol, certain performance deficiencies are exposed. For example, unwanted delays in data transmission are introduced into the network when a stream-based protocol is used for transaction-oriented data transfers. When data is being sent from one location to another, the stream-based protocol causes the data to be buffered into MTU packets before sending each segment of data. Complete MTU packets are sent continually until the last segment of data, which may be less than an MTU. If the remaining data to be sent in response to a transaction-based request is less than a complete MTU, the stream-based protocol will cause it to be held in the buffer in anticipation of more data being sent. As a result, the buffered data will not be sent until a timer within the host processor expires. The delay introduced by this sequence can result in a severe restriction on the number of transactions that can be processed over a period of seconds or minutes.

Additionally, a stream-based protocol, such as TCP, inherently reduces the efficiency of data transmission. After one or more segments of data are transmitted, the client is required to send an acknowledgment packet to the sending processor. The acknowledgment packet indicates to the server the last contiguous segment that has been properly received by the client, so that the server can resend any packets that may be missing. This results in a large ratio of acknowledgment packets being sent per data packets received, resulting in less than optimal use of the network.

Due to the aforementioned limitations, there is a need for an enhanced stream-based network protocol implementation that optimizes performance and network utilization. Additionally, there is a need for the transactions to be more efficient when a stream-based network protocol is employed with transaction-based data transmission.

SUMMARY OF THE INVENTION

In accordance with an exemplary embodiment of the present invention, to compensate for limitations that arise when a transaction-based protocol is used together with stream-based protocols, the stream-based protocol is modified to take advantage of certain characteristics of transaction-based protocols.

In one aspect of the present invention, in order to compensate for data transmission delays, the modified stream-based protocol uses knowledge of the amount of data being received from a server to anticipate when the last data segment is expected from the server. The client can send the server a preemptive acknowledgment packet to force the server to immediately send any buffered data segment to the client, rather than waiting for a time period to expire before data transmission. As a result, the number of transactions that can be processed over a given time is increased.

In accordance with yet another aspect of the present invention, in order to compensate for inefficient network utilization, the modified stream-based protocol uses knowledge of the transaction-based protocol to anticipate the amount of data being returned from the server for each client request. As a result, the stream-based protocol located at the client can forego the usual acknowledgment packet after every few data segments, and send acknowledgments only when required to complete the transmission. This results in far fewer segments being sent from the client to the server, and thus a much more optimal use of the intervening network.

BRIEF DESCRIPTION OF THE DRAWINGS

These and other features, objects and advantages associated with the present invention will be more readily understood from the following detailed description of an embodiment of the invention, when read in conjunction with the drawings in which like reference numerals refer to like elements and where.

DETAILED DESCRIPTION

The present invention will be described hereinafter with reference to an embodiment illustrated in the accompanying drawings, in which a stream-based TCP is interfaced with a transaction-based protocol, such as AppleTalk Filing Protocol (AFP). However, the invention is not limited to only the embodiments set forth within this disclosure. Rather, the stream-based TCP and the transaction-based AFP, as illustrated in this disclosure, are meant to be exemplary of many other stream-based and transaction-based protocols that can be employed together in accordance with various embodiments of the invention for the purpose of improving network performance.

Figure 1:
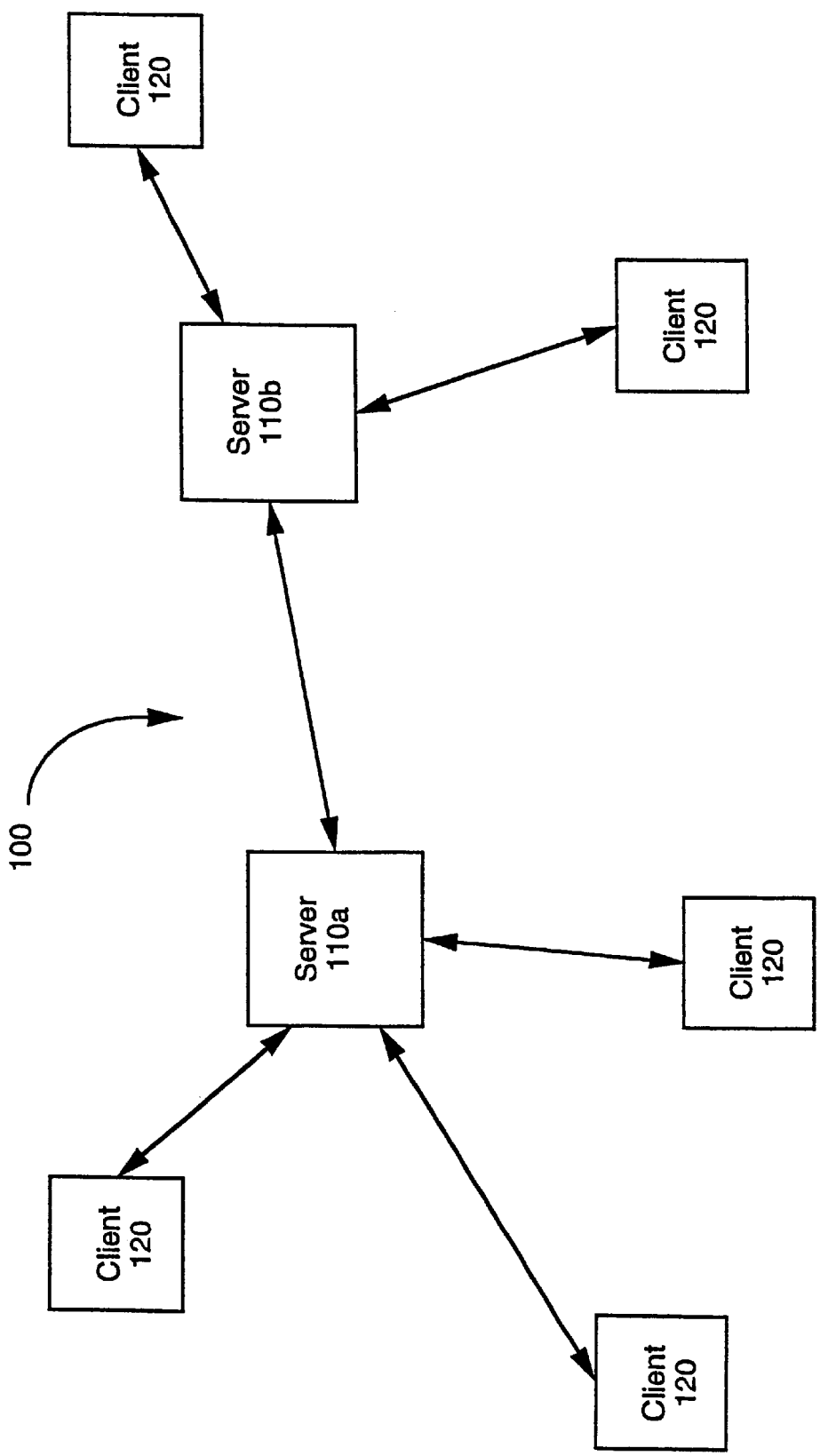
FIG. 1 is an exemplary block diagram of a client/server communications system.
Figure 2:
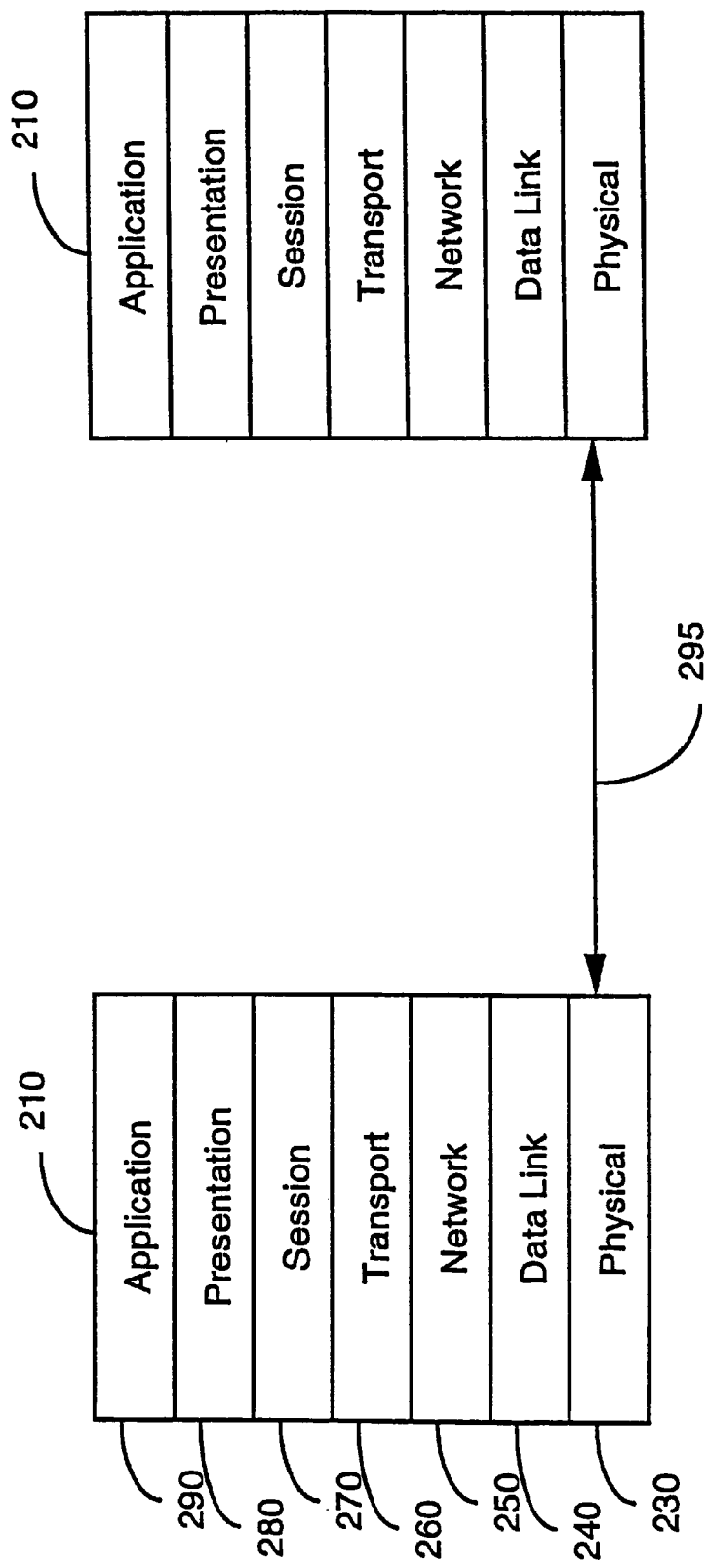
FIG. 2 illustrates an example of conventional communications between a client and server utilizing transaction-oriented traffic on a stream-based network protocol.

Many networks, such as the client/server network illustrated in FIG. 1, utilize protocols which adhere to an Open Systems Interconnection (OSI) reference model. This model establishes a standardized framework and terminology for describing the protocols of network architectures, as illustrated in FIG. 2. Each processor 210, which can represent a server or client, for example, implements seven "layers" through which communications can be performed. Within each layer, different system operations are performed. Protocols associated with each layer are able to communicate with one another through the hierarchy of layers. For example, a protocol located on a first layer of the network can communicate with a protocol on another layer directly above or below it. Additionally, a protocol located on a layer can communicate with a counterpart protocol operating at the same layer on another processor. The use of different protocols between the layers allows selected services to be performed by other layers without exposing the details of actual implementation within a given layer.

A physical layer 230 is concerned with the transmission of raw data to other processors via a connection 295. The physical layer receives packets of data from the data-link layer 240 and converts the packets into binary values used in digital transmission. The data link layer 240 receives, creates and transmits data packets through the use of the physical layer 230. Data link control protocols are used to label, package and send packets.

The network layer 250 contains protocols which determine how data is routed from the source to the destination and establish and maintain a logical connection between the two processors. For example, Internet Protocol (IP) is a widely supported network layer protocol which defines and routes datagrams across the network and provides connectionless transport service. IP utilizes packet switching in the data link layer 240 to accomplish actual transmission along a path.

The transport layer 260 employs protocols that are responsible for providing data transfer at a certain level of quality (i.e., error rate or transmission speed). Transmission control protocol (TCP) is an example of a connection- and stream-based transport layer protocol which has no boundaries on data. TCP can use IP at the network layer in order to deliver packets of data. The session layer 270 protocols provide sequencing and synchronization of the dialog and data packets in a network connection. The presentation layer 280 employs protocols to perform common functions such as data formatting, encoding, encryption and decryption.

Finally, application layer 290 protocols perform common data base accessing and file transfer. AppleTalk File protocol (AFP) is an example of an application layer protocol which is a remote access file protocol that is a transaction-based protocol. AFP can be used between file servers and clients in a network and for remote access to a network.

Each of the layers described with respect to each processor in FIG. 2 are arranged in order to form a protocol stack for each processor within the LAN. A protocol stack is a set of protocols which work together on different levels to facilitate communication on a network. One of the most popular standard protocol stacks is the TCP/IP protocol stack, which supports both wide area networks and local area networks.

When a transaction-oriented application protocol is employed, the overall communication that takes place between the server and a client is transaction-oriented, even though a stream-based protocol stack, such as TCP/IP, may be in use. Therefore, when a client processor makes a request through a protocol such as AFP, for example to access a file, the response containing the necessary data from the server is transaction-based.

Figure 3:
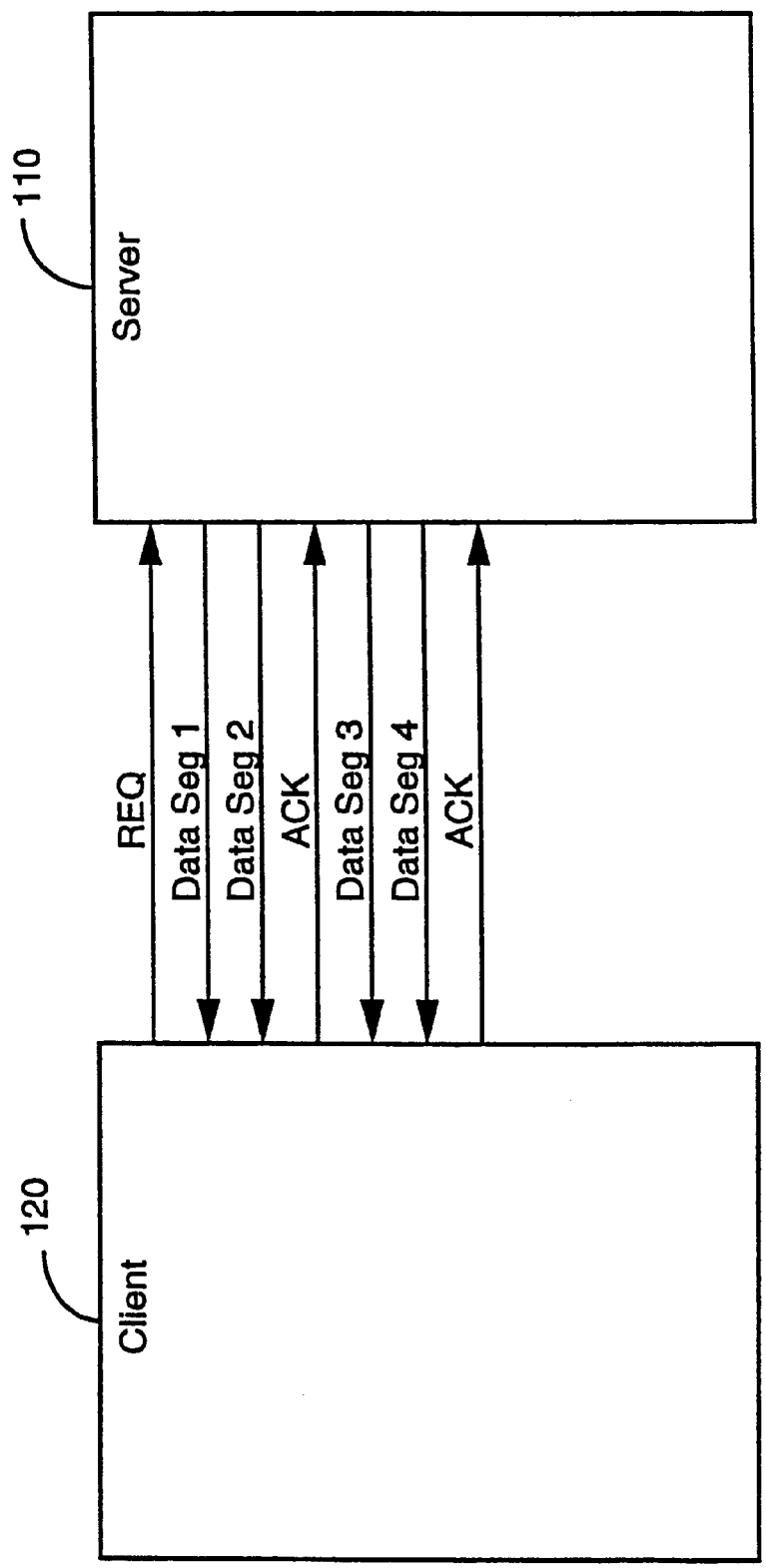
FIG. 3 is an exemplary block diagram showing the conventional OSI reference model.

FIG. 3 illustrates communication between a client and server using a conventional TCP implementation. Initially, the client 120 makes a request, REQ, to the server 110. For instance, the request may be for 8 kilobytes of data from a file stored at the server. The server 110, once it receives the request, sends segments of data, (e.g., DATA SEG. 1, DATA SEG. 2) back to the client 120. For example, if the Maximum Transmission Unit (MTU) is 1460 bytes of data, the server will send segments of this size until all 8 kilobytes of the requested data have been sent. The TCP protocol guarantees that the segments will be delivered to or from the server. In accordance with this feature of the protocol, therefore, the client sends an acknowledgment signal, ACK, to the server 110 upon successful receipt of a segment. Typically, the ACK signal is sent after every other segment is successfully received, as depicted in FIG. 3. The ACK signal indicates the last segment in a contiguous series of segments that have been properly received by the client. It can be seen that a considerable number of ACK signals are required to successfully transmit data, resulting in less than optimal use of the network.

In contrast to the TCP protocol, a transaction-based protocol such as AFP does not guarantee delivery of data segments, and therefore acknowledgments are not employed. Rather, the server specifies the amount of data that is being sent in response to a request, and error recovery mechanisms are utilized on this data at the receiving end.

Figure 4:
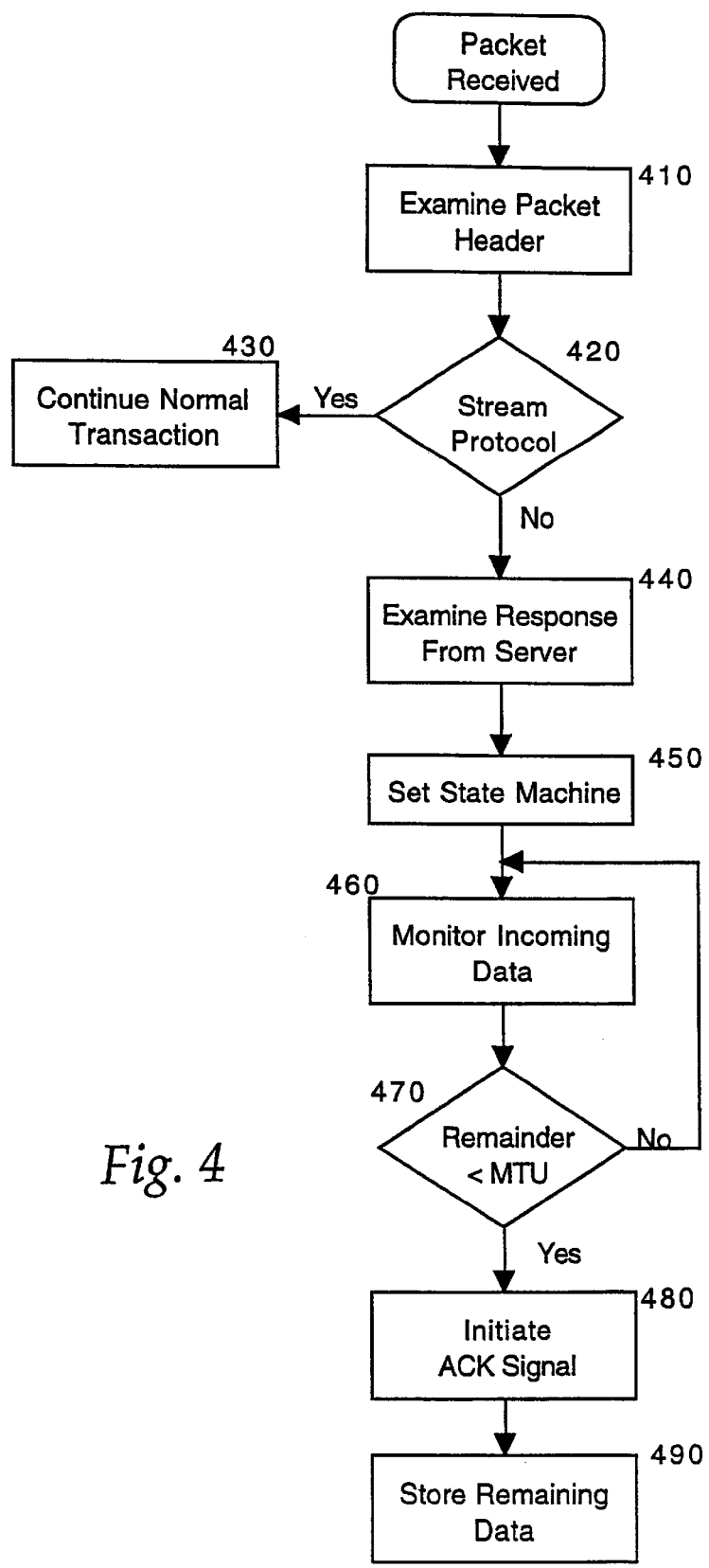
FIG. 4 is a flow diagram of the modified stream-based protocol employed in a network in accordance with the present invention.

In accordance with an exemplary embodiment of the present invention, a modified TCP/IP protocol stack is employed at the client which utilizes characteristics of the transaction-based protocol to provide more efficient network operation. The flow diagram of FIG. 4 illustrates the manner in which a modified TCP/IP stack is able to reduce system delays while increasing network efficiency. Initially, as shown in step 410, after receiving a data packet to be sent to the server, the modified TCP/IP protocol stack determines whether a transaction-oriented protocol or a stream-based protocol is being employed in the application layer of the client 120. This might be done, for example, by examining the header of the packet and matching the pattern of the header information with that of known protocols to determine which protocol is being employed. As shown in step 420, if a stream-based protocol is determined to be employed in the application layer of the client processor (i.e. transactions between the client and server are stream-based), then no further inquiry is necessary and conventional client/server transactions are continued without modification, as shown in step 430.

If the application layer protocol is determined to be transaction-based, a response packet is awaited from the server. In step 440, the header of the server's response to the request is examined. The examination identifies the total amount of data to be transmitted. In step 450, once this information is known, the TCP protocol stack sets a state machine, located in the client 120, to a value related to the amount of data to be received. In step 460, the client keeps track of the segments being received. Through comparison of the data remaining with the MTU value for the network, the client is able to determine when the amount of data that remains to be received is less than an MTU.

In step 470, when the client determines that the amount of data to be transferred from the server is less than the MTU value, the modified TCP implementation initiates a preemptive ACK signal. In accordance with the stream-based protocol, the ACK signal causes the server to send the next segment of data stored in the buffer, i.e, the server is "poked" to transmit the next segment, whether or not it comprises a complete MTU. Consequently, the remaining amount of data to be transmitted from the server is immediately sent to the client, without the delay normally associated with buffering of the data. As a result, the performance of the network is improved without any modification of TCP/IP stack located on server side of the network.

Additionally, in contrast to the system illustrated in FIG. 2, since the amount of data being transferred is known, the client TCP can forego sending an acknowledgment after every second data segment, and instead send an acknowledgment only when required (e.g., at the end of the response by the server). Hence, the only ACK signals required are the preemptive "poke" signal initiated by the modified TCP to send the last data segment, and a final ACK signal.

Figure 5:
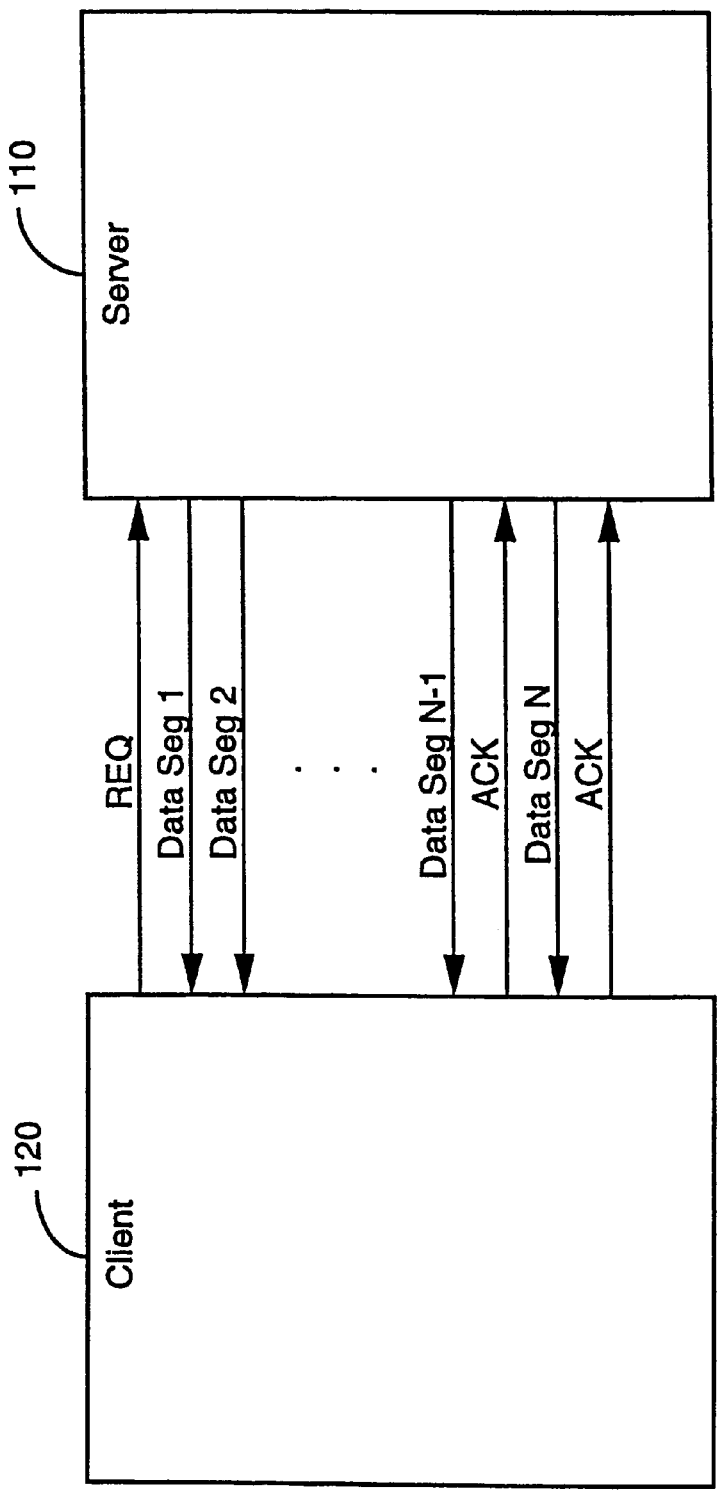
FIG. 5 is an exemplary block diagram showing data communication between a client and a server in accordance with the present invention utilizing transaction-oriented traffic on a stream-based network protocol.

An example of the manner in which the modified TCP works is illustrated in the block diagram of FIG. 5. A client processor initially sends a REQ signal to the server processor when requiring access to, for example, a file. In response to the request, the server transmits a transaction-based data packet, if a transaction-based protocol is being employed in the application layer of the server. The initial data packet, DATA SEG1, identifies the total amount of data to be sent. This information is contained within the header for the application-layer protocol.

The modified TCP of the present invention examines this header to determine the total amount of data to be transmitted in response to the request. At that point, the state machine is set to this value, and the data packets are sequentially received without sending the ACK signals. Meanwhile, the client processor continually monitors the amount of data that has been transferred from the server to the client. When it is determined by the client processor that the last segment of data, DATA SEG N, is being buffered at the server processor, it sends a preemptive ACK signal back to the server. This data is then immediately transmitted to the client and a final ACK signal is sent to acknowledge its receipt. As a result, there are only two ACK signals for each "quantum" of data using the modified TCP, and due to the preemptive ACK signal, there is no delay in receiving the last data in a transaction.

In a stream-based protocol such as TCP, the server monitors the acknowledgment signals from the client to ensure the successful receipt of successive data packets. Each acknowledgment contains a pointer which identifies the last packet of a series of contiguous packets that were received at the client. The server looks for a progression of pointers in the successive acknowledgments. If the pointer remains the same over several acknowledgments, rather than advancing, this signifies that a packet has not been successfully received. In this case, the server implements a fast retransmission of the packets which follow the last successfully received packet.

As a further feature of the invention, the client can employ this aspect of the protocol to compensate for hardware problems. More particularly, if packets of data are being lost due to interruptions in the signal from the server, upon detecting such a condition the client can repeatedly send a number of acknowledgments with the same pointer. This will cause the server to immediately resend the data packets which were lost, and thereby avoid the normal latency associated with the detection and retransmission of packets at the server.

From the foregoing, it can be seen that the present invention increases the efficiency of network communication when a transaction-based protocol is employed in conjunction with a stream-based protocol. This efficiency results from the decrease in the number of acknowledgment signals that are sent from a client to a server, as well as elimination of the latencies associated with the buffering of data at the server. A particular advantage of this approach is the fact that the modification of the TCP protocol to achieve this operation only occurs at the client station, on an as-needed basis, and does not affect the standard stream-based protocol at the server.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A client computer, comprising:

means for issuing a request for data;

means for determining the amount of data to be received in response to said request;

means for monitoring received data and detecting when the remaining amount of data to be received is less than a predetermined amount; and means for sending a preemptive acknowledgment in response to said detection.

2. The computer of claim 1 wherein said predetermined amount is based upon the maximum size for data segments that can be transmitted over a network via which said computer receives said data.

3. The computer of claim 2 wherein said predetermined amount is equal to said maximum size.

4. The computer of claim 1 further including means for sending a second acknowledgment upon receipt of said remaining data.

5. The computer of claim 4 wherein the transmission of acknowledgments, other than said preemptive acknowledgment and said second acknowledgment, is inhibited during the transmission of data in response to said request.

6. The computer of claim 1 further including means for detecting a loss of data to be received, and repeatedly sending the same acknowledgment, to prompt retransmission of the lost data.

7. A computer for communicating over a network, comprising:

means for transmitting a request and means for receiving at least one transmission packet;

means for determining whether said request conforms to a transaction-based protocol;

means for determining the maximum amount of data in a transmission packet and the total amount of data to be received when said request conforms to a transaction-based protocol; and means for issuing an acknowledgment only when an amount of data remaining to be received is less than said maximum amount of data in a transmission packet.

8. The computer of claim 7 further including means for sending a second acknowledgment upon receipt of said remaining data.

9. A computer-readable medium containing a program that executes the following steps:

issuing a request for data;

determining the amount of data to be received in response to said request;

monitoring received data and detecting when the remaining amount of data to be received is less than a predetermined amount; and sending a preemptive acknowledgment in response to said detection.

10. The computer-readable medium of claim 9 further including the step of sending a second acknowledgment upon receipt of said remaining data.

11. The computer-readable medium of claim 10 wherein said program inhibits the transmission of acknowledgments, other than said preemptive acknowledgment and said second acknowledgment, during the transmission of data in response to said request.

12. The computer-readable medium of claim 9 wherein said predetermined amount is based upon the maximum size for data segments that can be transmitted over a network via which said computer receives said data.

13. A computer-readable medium containing a program that executes the following steps:

transmitting a request for data;

determining whether said request conforms to a transaction-based protocol;

determining the maximum amount of data in a transmission packet and the total amount of data to be received when said request conforms to a transaction-based protocol; and issuing an acknowledgment only when an amount of data remaining to be received is less than said maximum amount of data in a transmission packet.

14. The computer-readable medium of claim 13 further including the step of sending a second acknowledgment upon receipt of said remaining data.

* * * * *